United States Patent [19]
Chen

[11] Patent Number: 6,089,672
[45] Date of Patent: Jul. 18, 2000

[54] BICYCLE WHEEL RIM

[75] Inventor: Chao-Ying Chen, Tainan Hsien, Taiwan

[73] Assignee: Alex Machine Industrial Co., Ltd., Tainan Hsien, Taiwan

[21] Appl. No.: 09/321,467

[22] Filed: May 27, 1999

[51] Int. Cl.[7] .................................................. B60B 1/02
[52] U.S. Cl. ................................. 301/58; 301/97; 301/98
[58] Field of Search ................................ 301/95, 96, 97, 301/58, 55, 104, 105.1, 98, 57

[56] References Cited

U.S. PATENT DOCUMENTS

| | | | |
|---|---|---|---|
| 308,794 | 12/1884 | Pratt | 301/58 |
| 888,558 | 5/1908 | Walbridge | 301/96 |
| 1,207,277 | 12/1916 | Copithorn | 301/55 |
| 1,286,191 | 11/1918 | Putnam | 301/97 |
| 1,652,146 | 12/1927 | Michelin | 301/63.1 |
| 1,676,303 | 7/1928 | Wagenhorst | 301/96 |
| 3,008,770 | 11/1961 | Mueller | 301/97 |
| 4,040,671 | 8/1977 | Hersh | 301/58 |
| 5,499,864 | 3/1996 | Klein et al. | 301/97 |
| 5,651,591 | 7/1997 | Mercat et al. | 301/95 |
| 5,653,510 | 8/1997 | Osborne | 301/95 |
| 5,806,935 | 9/1998 | Shermeister | 301/58 |

*Primary Examiner*—S. Joseph Morano
*Assistant Examiner*—Lomg Bao Nguyen
*Attorney, Agent, or Firm*—Townsend and Townsend and Crew LLP

[57] ABSTRACT

A bicycle wheel rim adapted for mounting a plurality of spokes thereon includes spaced left and right tire retaining walls, an annular spoke mounting wall, an annular connecting wall, and left and right reinforcing walls. The spoke mounting wall interconnects inner edges of the tire retaining walls, and has a central spoke fastening portion formed with spoke fastening holes. The connecting wall is disposed around the spoke mounting wall, and interconnects intermediate portions of the tire retaining walls. The left reinforcing wall has a first end connected to a left terminating edge of the connecting wall and the intermediate portion of the left tire retaining wall, and a second end connected to the central spoke fastening portion of the spoke mounting wall. The left reinforcing wall is inclined with respect to the left tire retaining wall. The right reinforcing wall has a first end connected to a right terminating edge of the connecting wall and the intermediate portion of the right tire retaining wall, and a second end connected to the central spoke fastening portion of the spoke mounting wall. The right reinforcing wall is inclined with respect to the right tire retaining wall.

10 Claims, 4 Drawing Sheets

BICYCLE WHEEL RIM

BACKGROUND OF THE INVENTION

1. Field of the Invention

This invention relates to a bicycle wheel rim, more particularly to a bicycle wheel rim which has an enhanced strength to resist impact applied on tire retaining walls thereof.

2. Description of the Related Art

Referring to FIG. 1, after a bicycle is in use for a period of time, the drive chain 1 thereof might become loose and slightly lengthen. At this time, the drive chain 1 can be easily released from the chain wheel 31 to result in inconvenience during use of the bicycle. As such, an adjustment device 3 has been provided to permit adjustment of the position of the axle 20 of the rear wheel on the bicycle frame. The adjustment device 3 is mounted on the chain stay 32 and the seat stay 30 of the bicycle frame, and includes a plate member formed with an elongated slot 300 for retaining the axle 20 of the rear wheel therein. When the drive chain 1 becomes loose, the axle 20 can be moved along the slot 300 to permit the drive chain 1 to engage fittingly the chain wheel 31. However, since the rear brake 4 of the bicycle is mounted on the seat stay 30, and since the wheel rim 2 of the rear wheel moves together with the axle 20 during the adjustment operation, unless a corresponding position adjustment is made for the rear brake 4, the brake pads 40 (only one is shown) of the rear brake 4 cannot be kept in proper frictional contact with the brake pad contacting surfaces formed on the tire retaining walls 21 of the wheel rim 2 after the axle 20 has been moved to an adjusted position (shown in phantom lines in FIG. 1).

FIG. 2 is a sectional view of the conventional wheel rim 2, which is shown to include left and right tire retaining walls 21 having brake pad contacting surfaces 21a, an inner spoke mounting wall 23 interconnecting inner edges of the tire retaining walls 21 and formed with a set of spoke fastening holes 26, and an outer connecting wall 22 surrounding the spoke mounting wall 23 and interconnecting the tire retaining walls 21. Although the connecting wall 22 imparts strength to the wheel rim 2, the strength of the wheel rim 2 is still insufficient to resist impact applied on the tire retaining walls 21. In addition, the spoke mounting wall 23 buckles easily due to the tension of the spokes (not shown) mounted thereon.

In addition, in order to support the connecting wall 22, a pair of support ribs 24 are formed between the spoke mounting wall 23 and the connecting wall 22 to interconnect the same such that a central compartment (a) and two lateral compartments (b), (c) are formed between the connecting wall 22 and the spoke mounting wall 23. The connecting wall 22 is formed with a plurality of through holes 25 to permit passage of spoke fasteners 28 that are to be retained at the spoke fastening holes 26. During manufacture, the bicycle wheel rim 2 is formed from an elongated metal strip by bending the strip and connecting two opposite ends of the strip. The resulting annular rim is then immersed in a liquid electrolyte to form an anodized coating on the surface thereof. Typically, the inner surfaces of the lateral compartments (b) and (c) are also formed with the anodized coating to prevent corrosion thereof. Therefore, the connecting wall 22 is further formed with fluid passage holes 27 on lateral end portions thereof to permit entry of the liquid electrolyte into the compartments (b) and (c), thereby complicating the manufacturing process. Moreover, before a tire (not shown) is mounted on the wheel rim 2, an inner lining (not shown) is provided on the connecting wall 22 to cover the through holes 25 so that the peripheries of the through holes 25 are prevented from damaging the tire. However, the lining is not designed to cover the fluid passage holes 27 formed on the lateral end portions of the connecting wall 22. Thus, the tire is in direct contact with the peripheries of the fluid passage holes 27, and is susceptible to damaging by the peripheries of the holes 27.

SUMMARY OF THE INVENTION

Therefore, the object of the present invention is to provide a bicycle wheel rim which can overcome the aforesaid drawbacks that are commonly associated with the prior art.

Accordingly, the bicycle wheel rim of the present invention is used for mounting a plurality of spokes thereon, and includes spaced left and right tire retaining walls, an annular spoke mounting wall, an annular connecting wall, and left and right reinforcing walls. The tire retaining walls are adapted for retaining a bicycle tire therebetween. Each of the tire retaining walls has an inner edge proximate to a central point of the wheel rim, an outer edge distal to the central point of the wheel rim, and an intermediate portion between the inner and outer edges. The spoke mounting wall interconnects the inner edges of the tire retaining walls, and has a central spoke fastening portion which extends along the length thereof and which is formed with a set of spoke fastening holes that are adapted for mounting the spokes thereat. The connecting wall is disposed around the spoke mounting wall, and has a left terminating edge connected to the intermediate portion of the left tire retaining wall, and a right terminating edge connected to the intermediate portion of the right tire retaining wall. The left reinforcing wall has a first end connected to the left terminating edge of the connecting wall and the intermediate portion of the left tire retaining wall, and a second end connected to the central spoke fastening portion of the spoke mounting wall. The left reinforcing wall is inclined with respect to the left tire retaining wall. The right reinforcing wall has a first end connected to the right terminating edge of the connecting wall and the intermediate portion of the right tire retaining wall, and a second end connected to the central spoke fastening portion of the spoke mounting wall. The right reinforcing wall is inclined with respect to the right tire retaining wall.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENTS

Figure 1:
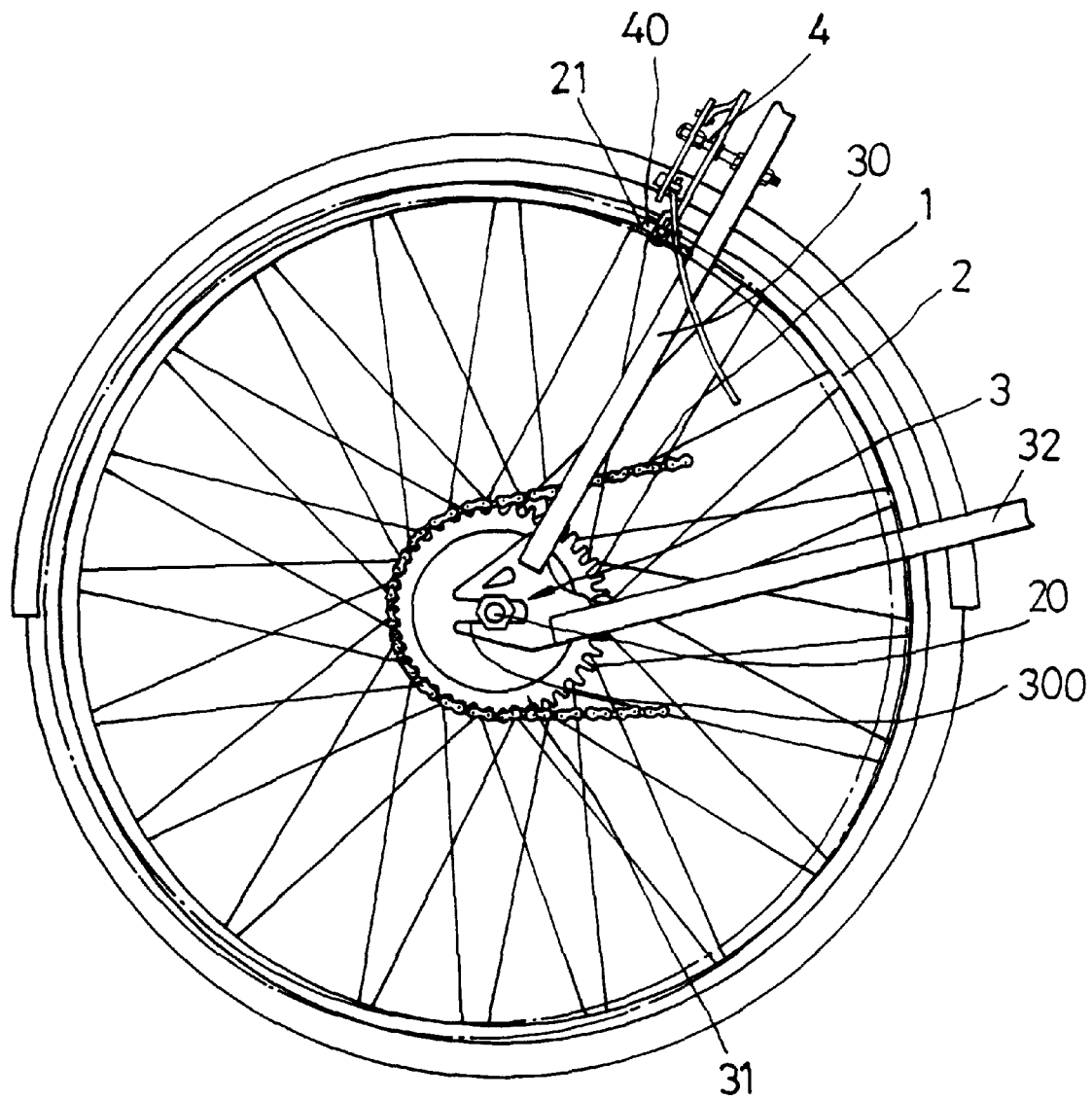
FIG. 1 is a side view illustrating a conventional bicycle wheel rim when in use.
Figure 2:
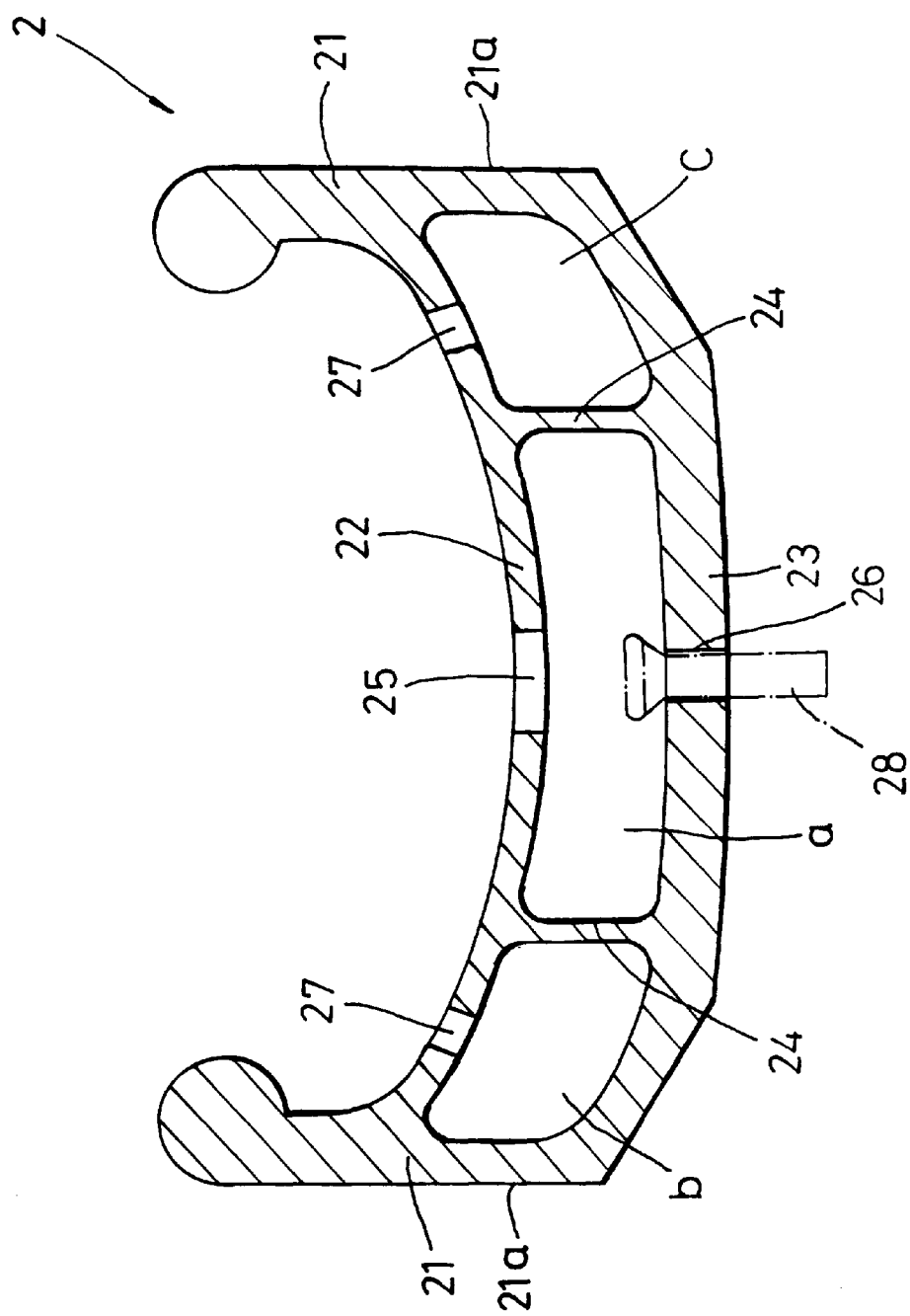
FIG. 2 is a sectional view of the conventional bicycle wheel rim.
Figure 3:
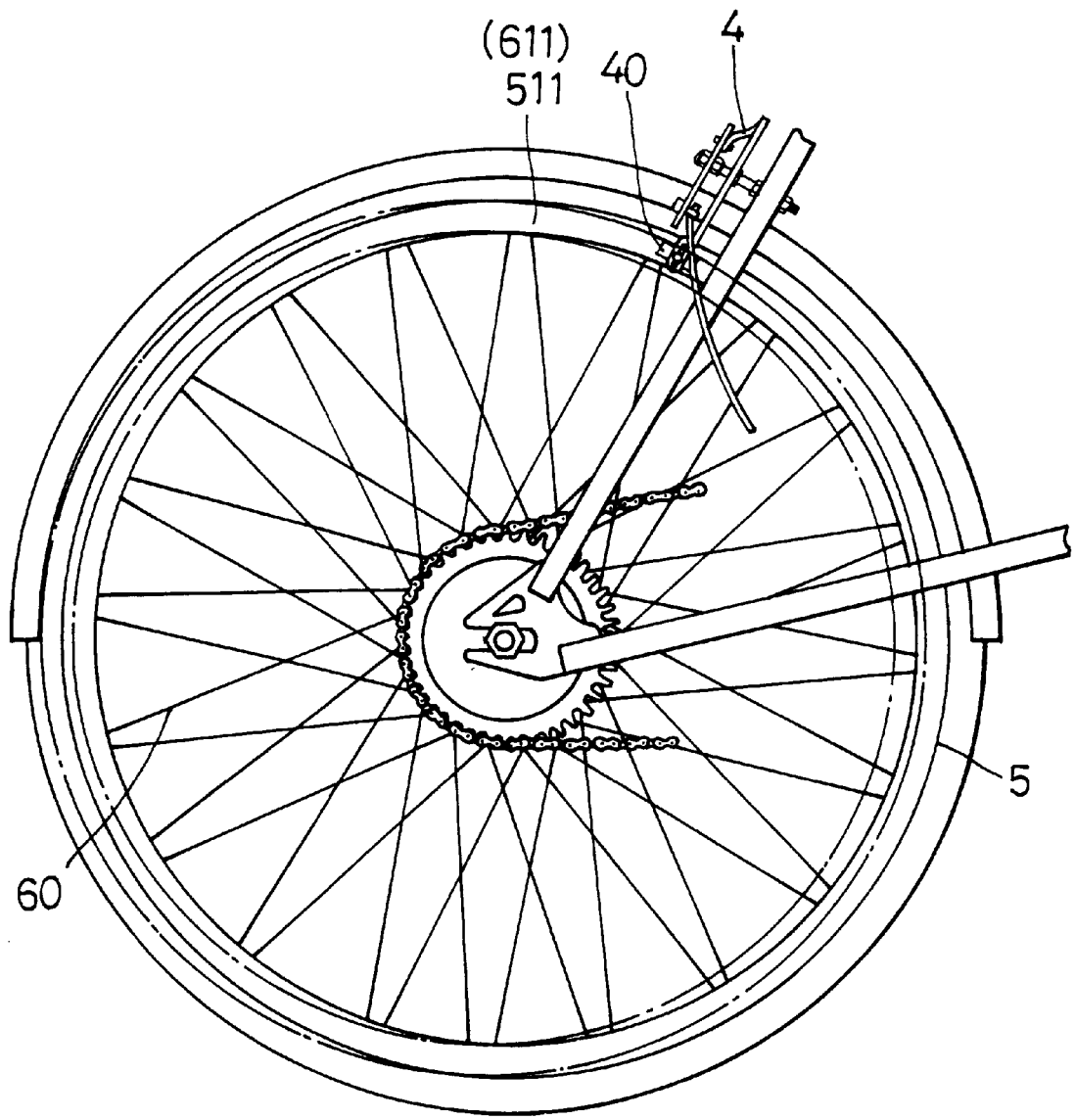
FIG. 3 is a side view illustrating a preferred embodiment of a bicycle wheel rim of the present invention when in use.
Figure 4:
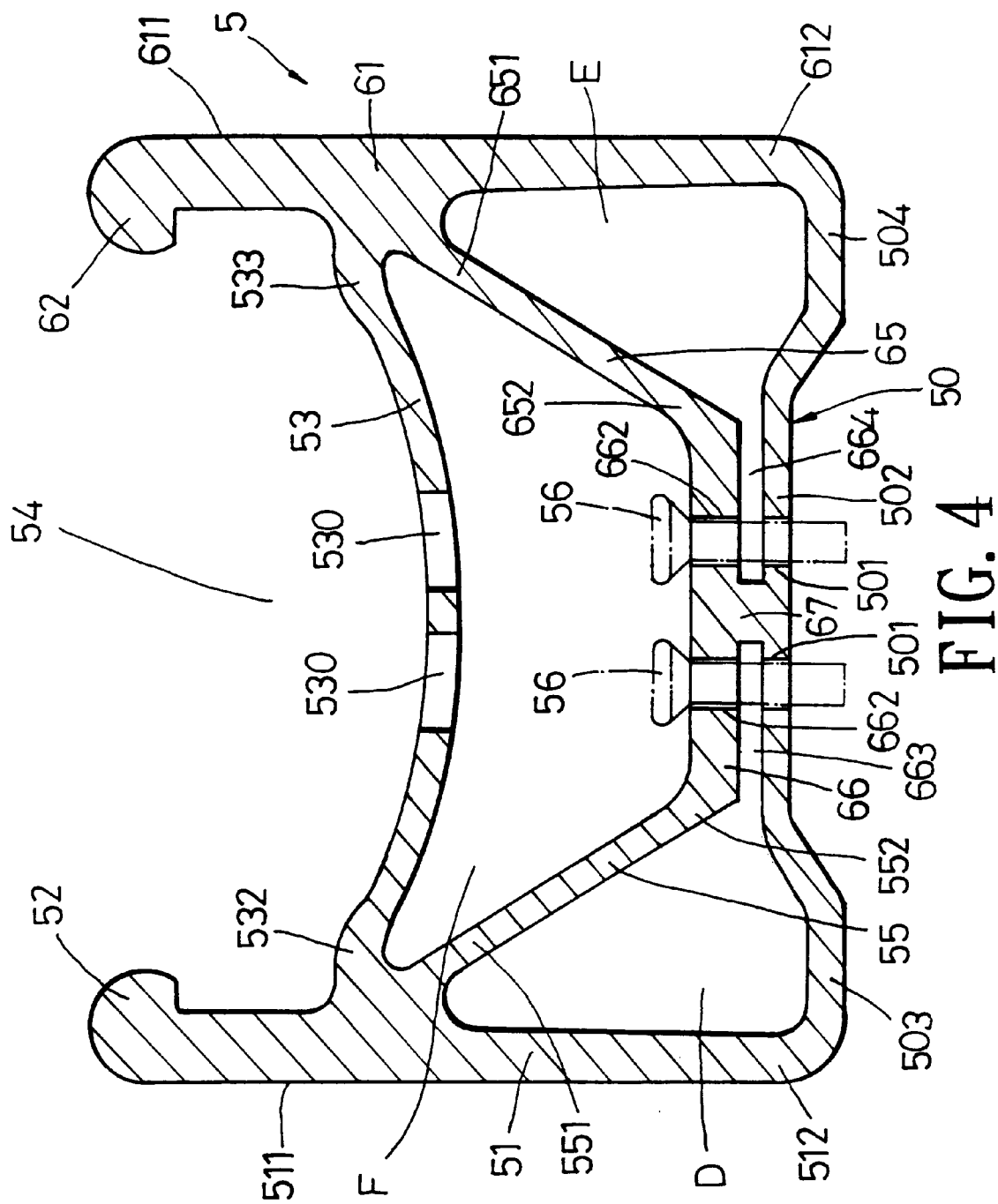
FIG. 4 is a sectional view of the preferred embodiment.

Referring to FIGS. 3 and 4, the preferred embodiment of the bicycle wheel rim 5 of the present invention is adapted for mounting a plurality of spokes 60 thereon by means of spoke fasteners 56, and is shown to include spaced left and right annular tire retaining walls 51, 61, an annular inner spoke mounting wall 50, an annular outer connecting wall 53, and left and right reinforcing walls 55, 65. Each of the tire retaining walls 51, 61 has an inner edge 512, 612 proximate to a central point of the bicycle wheel rim 5, and an outer edge which is distal to the central point of the bicycle wheel rim 5 and which is formed with a tire retaining flange 52, 62 that projects toward the other one of the tire retaining walls 51, 61.

The spoke mounting wall 50 has a central spoke fastening portion 502, which extends along the length of the spoke mounting wall 50 and which is formed with a set of spoke fastening holes 501 that are adapted for mounting the spoke fasteners 56 thereat. The spoke mounting wall 50 further has left and right end portions 503, 504 on opposite sides of the central spoke fastening portion 502 and connected to the central spoke fastening portion 502. The central spoke fastening portion 502 projects in a radial outward direction of the bicycle wheel rim 5 relative to the left and right end portions 503, 504. Each of the left and right end portions 503, 504 is connected to the inner edge 512, 612 of a respective one of the left and right tire retaining walls 51, 61 at a right angle.

The connecting wall 53 is disposed around the spoke mounting wall 50, and has a left terminating edge 532 connected to an intermediate section of the left tire retaining wall 51, and a right terminating edge 533 connected to an intermediate section of the right tire retaining wall 61 so as to define a tire retaining space 54 among the connecting wall 53 and the left and right tire retaining walls 51, 61 for retaining a bicycle tire between the tire retaining walls 51, 61. The connecting wall 53 has a central portion formed with a plurality of through holes 530 that are aligned respectively with the spoke fastening holes 501 in the spoke mounting wall 50 to permit passage of the spoke fasteners 56 therethrough.

The left reinforcing wall 55 has a first end 551 connected to the left terminating edge 532 of the connecting wall 53 and the intermediate section of the left tire retaining wall 51, and a second end 552 which extends toward the spoke fastening portion 502 of the spoke mounting wall 50. The left reinforcing wall 55 is inclined with respect to the left tire retaining wall 51. A first compartment (D) is formed among the left tire retaining wall 51, the left reinforcing wall 55, and the spoke mounting wall 50.

The right reinforcing wall 65 has a first end 651 connected to the right terminating edge 533 of the connecting wall 53 and the intermediate section of the right tire retaining wall 61, and a second end 652 which extends toward the spoke fastening portion 502 of the spoke mounting wall 50. The right reinforcing wall 65 is inclined with respect to the right tire retaining wall 61. A second compartment (E) is formed among the right tire retaining wall 61, the right reinforcing wall 65, and the spoke mounting wall 50.

A bridging wall 66 interconnects the second ends 552, 652 of the left and right reinforcing walls 55, 65. The bridging wall 66 is parallel to and is spaced apart from the spoke fastening portion 502 of the spoke mounting wall 50. A support rib 67 extends in a radial direction of the bicycle wheel rim 5 between the bridging wall 66 and the spoke fastening portion 502 of the spoke mounting wall 50 to interconnect the same so as to define first and second channels 663, 664 on opposite sides of the support rib 67 and between the bridging wall 66 and the spoke fastening portion 502 of the spoke mounting wall 50. The first channel 663 is communicated fluidly with the first compartment (D).

The second channel 664 is communicated fluidly with the second compartment (E). The support rib 67 is disposed between two groups of the set of spoke fastening holes 501 in the spoke fastening portion 502. A first group of the spoke fastening holes 501 is communicated fluidly with the first channel 663. A second group of the spoke fastening holes 501 is communicated fluidly with the second channel 664. The bridging wall 66 is formed with two sets of spoke retaining holes 662 which are aligned respectively with the spoke fastening holes 501 in the spoke mounting wall 50. A first set of the spoke retaining holes 662 is communicated fluidly with the first channel 663. A second set of the spoke retaining holes 662 is communicated fluidly with the second channel 664. A third compartment (F) is formed among the left and right reinforcing walls 55, 65, the bridging wall 66 and the connecting wall 53.

During the manufacture of the bicycle wheel rim 5, the wheel rim 5 is immersed in a liquid electrolyte, allowing the electrolyte to enter into the compartments (D), (E), (F) so that an anodized coating can be formed on inner and outer surfaces of the wheel rim 5. The spoke fasteners 56 are extended through the through holes 530, and are retained at the spoke retaining holes 662 and the spoke fastening holes 501 for mounting of the spokes 60 thereon. As shown, each of the spoke retaining holes 662 has a size sufficient for retaining a respective one of the spoke fasteners 56 thereat. Before a tire is disposed in the tire retaining space 54, an inner lining (not shown) is provided on the connecting wall 53 for covering the through holes 530 in order to protect the tire.

As shown in FIG. 3, the bicycle wheel rim 5 is adapted for use with a brake device 4 which includes a brake pad 40 having a width in a radial direction of the bicycle wheel rim 5. Each of the left and right tire retaining walls 51, 61 has a brake pad contacting surface 511, 611 that has a width in the radial direction of the bicycle wheel rim 5. The width of the brake pad contacting surfaces 511, 611 is at least twice the width of the brake pad 40. As such, after the wheel rim 5 moves together with the axle of the rear wheel to an adjusted position where the drive chain can engage fittingly the chain wheel, as shown in phantom lines in FIG. 3, the brake pad 40 can still be kept in proper frictional contact with the brake pad contacting surface 511, 611.

With the provision of the left and right reinforcing walls 55, 65, an enhanced strength is achieved to resist impact applied on the tire retaining walls 51, 61. In the preferred embodiment, the spoke mounting wall 50 is connected to the left and right tire retaining walls 51, 61 at right angles. This results in increased strength to the tire retaining walls 51, 61.

In addition, when the bicycle wheel rim 5 is immersed in an electrolyte for forming an anodized coating on the surface thereof, the electrolyte is permitted to enter into the compartments (D), (E), (F) via the through holes 530, the spoke fastening holes 501 and the spoke retaining holes 662. Thus, the need to form fluid passage holes as taught in the prior art has been eliminated.

Moreover, since the spoke fastening portion 502 of the spoke mounting wall 50 cooperates with the bridging wall 66 to mount the spoke fasteners 56 thereon, the wheel rim 5 has an enhanced strength to resist buckling of the spoke mounting wall 50 due to the tension of the spokes 60.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A bicycle wheel rim for mounting a plurality of spokes thereon, comprising:

spaced left and right annular tire retaining walls adapted for retaining a bicycle tire therebetween, each of said tire retaining walls having an inner edge proximate to a central point of said wheel rim, an outer edge distal to the central point of said wheel rim, and an intermediate portion between said inner and outer edges;

an annular spoke mounting wall interconnecting said inner edges of said tire retaining walls, said spoke mounting wall having a central spoke fastening portion which extends along length of said spoke mounting wall and which is formed with a set of spoke fastening holes that are adapted for mounting the spokes thereat;

an annular connecting wall disposed around said spoke mounting wall, said connecting wall having a left terminating edge connected to said intermediate portion of said left tire retaining wall, and a right terminating edge connected to said intermediate portion of said right tire retaining wall;

a left reinforcing wall which has a first end connected to said left terminating edge of said connecting wall and said intermediate portion of said left tire retaining wall, and a second end connected to said central spoke fastening portion of said spoke mounting wall, said left reinforcing wall being inclined with respect to said left tire retaining wall; and a right reinforcing wall which has a first end connected to said right terminating edge of said connecting wall and said intermediate portion of said right tire retaining wall, and a second end connected to said central spoke fastening portion of said spoke mounting wall, said right reinforcing wall being inclined with respect to said right tire retaining wall.

2. The bicycle wheel rim according to claim 1, wherein said spoke mounting wall further has left and right end portions on opposite sides of said central spoke fastening portion and connected to said central spoke fastening portion, each of said left and right end portions being connected to said inner edge of a respective one of said left and right tire retaining walls at a right angle.

3. The bicycle wheel rim according to claim 2, wherein said central spoke fastening portion of said spoke mounting wall projects in a radially outward direction of said bicycle wheel rim with respect to said left and right end portions of said spoke mounting wall.

4. The bicycle wheel rim according to claim 1, wherein said left tire retaining wall, said left reinforcing wall and said spoke mounting wall cooperatively define a first compartment thereamong, and said right tire retaining wall, said right reinforcing wall and said spoke mounting wall cooperatively define a second compartment thereamong.

5. The bicycle wheel rim according to claim 4, further comprising:

a bridging wall which interconnects said second ends of said left and right reinforcing walls and which is disposed around and which is spaced apart from said central spoke fastening portion of said spoke mounting wall; and a support rib interconnecting said bridging wall and said spoke fastening portion, said support rib cooperating with said bridging wall and said spoke mounting portion of said spoke mounting wall to define first and second channels on opposite sides of said support rib, said first and second channels being communicated fluidly and respectively with said first and second compartments.

6. The bicycle wheel rim according to claim 5, wherein said spoke fastening portion of said spoke mounting wall is formed with two groups of said spoke fastening holes on opposite sides of said support rib, a first group of said spoke fastening holes being communicated fluidly with said first channel, a second group of said spoke fastening holes being communicated fluidly with said second channel.

7. The bicycle wheel rim according to claim 6, the spokes being mounted on said bicycle wheel rim by means of spoke fasteners, wherein said bridging wall is formed with two sets of spoke retaining holes which are aligned respectively with said spoke fastening holes, each of said spoke retaining holes having a size sufficient for retaining a respective one of the spoke fasteners thereat.

8. The bicycle wheel rim according to claim 7, wherein said connecting wall is formed with two sets of through holes that are aligned respectively with said spoke retaining holes and that are adapted to permit passage of the spoke fasteners therethrough.

9. A bicycle wheel rim adapted for use with a brake pad having a width in a radial direction of said bicycle wheel rim and adapted for mounting a plurality of spokes thereon, said bicycle wheel rim comprising:

spaced left and right annular tire retaining walls adapted for retaining a bicycle tire therebetween, each of said tire retaining walls having an inner edge proximate to a central point of said wheel rim, an outer edge distal to the central point of said wheel rim, and an intermediate portion between said inner and outer edges, each of said tire retaining walls further having an outer brake pad contacting surface that has a width in the radial direction of said bicycle wheel rim, the width of said brake pad contacting surface of each of said tire retaining walls being at least twice the width of the brake pad;

an annular spoke mounting wall interconnecting said inner edges of said tire retaining walls, said spoke mounting wall having a central spoke fastening portion which extends along length of said spoke mounting wall and which is formed with a set of spoke fastening holes that are adapted for mounting the spokes thereat;

an annular connecting wall disposed around said spoke mounting wall, said connecting wall having a left terminating edge connected to said intermediate portion of said left tire retaining wall, and a right terminating edge connected to said intermediate portion of said right tire retaining wall;

a left reinforcing wall which has a first end connected to said left terminating edge of said connecting wall and said intermediate portion of said left tire retaining wall, and a second end connected to said central spoke fastening portion of said spoke mounting wall, said left reinforcing wall being inclined with respect to said left tire retaining wall; and a right reinforcing wall which has a first end connected to said right terminating edge of said connecting wall and said intermediate portion of said right tire retaining wall, and a second end connected to said central spoke fastening portion of said spoke mounting wall, said right reinforcing wall being inclined with respect to said right tire retaining wall.

10. A bicycle wheel rim adapted for use with a brake pad having a width in a radial direction of said bicycle wheel rim and adapted for mounting a plurality of spokes thereon, said bicycle wheel rim comprising:

spaced left and right annular tire retaining walls adapted for retaining a bicycle tire therebetween, each of said tire retaining walls having an inner edge proximate to a central point of said wheel rim, an outer edge distal to the central point of said wheel rim, and an intermediate portion between said inner and outer edges, each of said tire retaining walls further having an outer brake pad contacting surface that has a width in a radial direction of said wheel rim, the width of said brake pad contacting surface of each of said tire retaining walls being at least twice the width of the brake pad; and an annular spoke mounting wall interconnecting said inner edges of said tire retaining walls, said spoke mounting wall having a central spoke fastening portion which extends along a length of said spoke mounting wall and which is formed with a set of spoke fastening holes that are adapted for mounting the spokes thereat.

* * * * *